United States Patent
Hassani et al.

(10) Patent No.: US 11,780,445 B2
(45) Date of Patent: Oct. 10, 2023

(54) VEHICLE COMPUTER COMMAND SYSTEM WITH A BRAIN MACHINE INTERFACE

(71) Applicant: Ford Global Technologies, LLC, Dearborn, MI (US)

(72) Inventors: Ali Hassani, Ann Arbor, MI (US); Aniruddh Ravindran, Sunnyvale, CA (US); Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 450 days.

(21) Appl. No.: 16/741,425

(22) Filed: Jan. 13, 2020

(65) Prior Publication Data

US 2021/0213958 A1 Jul. 15, 2021

(51) Int. Cl.
*B60W 40/08* (2012.01)
*G06N 3/044* (2023.01)

(52) U.S. Cl.
CPC ............ *B60W 40/08* (2013.01); *G06N 3/044* (2023.01); *B60W 2040/0872* (2013.01)

(58) Field of Classification Search
CPC ........... B60W 2040/0872; B60W 40/08; G06F 3/015; G06F 3/0346; G06F 3/04842; G06F 3/01; G06F 3/14; G06N 20/10; G06N 3/0445; G05D 1/0016; G05D 2201/0213
See application file for complete search history.

(56) References Cited

U.S. PATENT DOCUMENTS

| 10,223,633 B2 * | 3/2019 | Breuer | H04L 9/3247 |
| 10,682,099 B2 * | 6/2020 | Ramer | H05B 47/175 |
| 10,807,527 B1 * | 10/2020 | Mauricia | B60W 40/08 |

(Continued)

FOREIGN PATENT DOCUMENTS

| CN | 104462716 A | * 3/2015 |
| CN | 104462716 B | 10/2017 |

(Continued)

OTHER PUBLICATIONS

Sean O'Kane, "Nissan's Future Cars May Read Your Brain to Prevent Accidents", The Verge, 3 pgs , Jan. 3, 2018.

(Continued)

*Primary Examiner* — Babar Sarwar
(74) *Attorney, Agent, or Firm* — Frank Lollo; Eversheds Sutherland (US) LLP

(57) ABSTRACT

Embodiments describe a vehicle configured with a brain machine interface (BMI) for a vehicle computing system to control vehicle functions using electrical impulses from motor cortex activity in a user's brain. A BMI training system trains the BMI device to interpret neural data generated by a motor cortex of a user and correlate the neural data to a vehicle control command associated with a neural gesture emulation function. A BMI system onboard the vehicle may receive a neural data feed of neural data from the user using the trained BMI device, determine, a user intention for a control instruction to control a vehicle infotainment system using the neural data feed, and perform an action based on the control instruction. The vehicle may further include a headrest configured as a Human Machine Interface (HMI) device that reads the electrical impulses without invasive electrode connectivity.

17 Claims, 5 Drawing Sheets

(56) References Cited

U.S. PATENT DOCUMENTS

| | | | |
|---|---|---|---|
| 11,093,033 B1* | 8/2021 | Wang | A61B 5/291 |
| 2014/0333529 A1* | 11/2014 | Kim | G06F 3/015 |
| | | | 345/156 |
| 2015/0054748 A1* | 2/2015 | Mason | G06F 3/017 |
| | | | 345/168 |
| 2016/0103487 A1* | 4/2016 | Crawford | A61B 5/117 |
| | | | 600/544 |
| 2016/0287124 A1* | 10/2016 | He | A61B 5/291 |
| 2017/0043782 A1* | 2/2017 | Farrell | B60W 40/08 |
| 2017/0106873 A1* | 4/2017 | Fung | B60Q 9/00 |
| 2017/0192423 A1* | 7/2017 | Rust | G05D 1/0238 |
| 2019/0100175 A1* | 4/2019 | Takeuchi | G08G 1/166 |
| 2019/0121431 A1* | 4/2019 | Lee | G06F 3/011 |
| 2019/0122475 A1* | 4/2019 | Dyne | G07C 9/10 |
| 2019/0196600 A1* | 6/2019 | Rothberg | G06V 40/20 |
| 2019/0290211 A1* | 9/2019 | Ramer | H05B 47/175 |
| 2019/0351895 A1* | 11/2019 | Ben-Ari | B60K 6/26 |
| 2020/0103913 A1* | 4/2020 | Zhu | G05B 13/0265 |
| 2020/0229730 A1* | 7/2020 | Wang | A61B 5/7278 |
| 2020/0371515 A1* | 11/2020 | Westbrook | G06F 3/015 |
| 2022/0095975 A1* | 3/2022 | Aluf | B60W 60/0051 |

FOREIGN PATENT DOCUMENTS

| | | | | | |
|---|---|---|---|---|---|
| CN | 108287961 | A | * | 7/2018 | |
| CN | 108491071 | A | * | 9/2018 | G05B 13/042 |
| CN | 110329268 | A | * | 10/2019 | B60W 40/08 |
| CN | 110502103 | A | * | 11/2019 | |
| CN | 112000087 | A | * | 11/2020 | |
| WO | WO-2020204809 | A1 | * | 10/2020 | A61B 5/318 |
| WO | WO-2020211958 | A1 | * | 10/2020 | G06F 3/015 |

OTHER PUBLICATIONS

Bitbrain, "Nissan's Brain-To-Vehicle Technology Communicates Our Brains With Vehicles", 9 pgs , Sep. 19, 2016.

* cited by examiner

VEHICLE COMPUTER COMMAND SYSTEM WITH A BRAIN MACHINE INTERFACE

TECHNICAL FIELD

The present disclosure relates to brain-machine interfaces, and more particularly, to aspects of automotive vehicle control via a brain machine interface with a vehicle infotainment system.

BACKGROUND

Brain machine interface (BMI) is a technology that enables humans to provide commands to computers using human brain activity. BMI systems provide control input by interfacing an electrode array with the motor cortex region of the brain, either externally or internally, and decoding the activity signals using a trained neural decoder that translates neuron firing patterns in the user's brain into discrete control commands which in the present disclosure are implemented in automotive vehicles as vehicle control commands.

BMI interfaces can include either invasive direct-contact electrode interface techniques that work with internal direct contact with motor cortex regions, or include non-invasive electrode interface techniques, where wireless receivers utilize sensors to measure electrical activity of the brain to determine actual as well as potential electrical field activity using functional MRI (fMRI), electroencephalography (EEG) or electric field encephalography (EFEG) receivers that may externally touch the scalp, temples, forehead, or other areas of the user's head. BMI systems generally work by sensing the potential electrical field activity, amplifying the data, and processing the signals through a digital signal processor to associate stored patterns of brain neural activity with functions that may control devices or provide some output using the processed signals. Recent advancements in BMI technology have contemplated aspects of vehicle control using BMIs.

A BMI system used to control a vehicle using EFEG is disclosed in Korean Patent Application Publication No. KR101632830 (hereafter "the '830 publication), which describes recognition of control bits obtained from an EEG apparatus for drive control of a vehicle. While the system described in the '830 publication may use some aspects of EFEG data for vehicle signal control, the '830 publication does not disclose a BMI integrated infotainment system in a semi-autonomous vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosed systems and methods describe a BMI system implemented in a vehicle. In some embodiments, a user may exercise control over onboard computer functionality (e.g., an infotainment system) using the BMI system to read electrical impulses from the motor cortex of the user's brain, decode a continuous neural data feed, and issue control commands in real time or substantially real time.

In one embodiment, the BMI system may include an EFEG system configured to receive electric potential field signatures from the user's motor cortex using scalp-to-electrode (external) contacts that read and process the signals. In other aspects, the electrodes may be disposed proximate the user's scalp without physical external contact with the scalp surface, but within a relatively short operative range in terms of physical distance for signal collection. In an embodiment, the brain-machine interface device may include a headrest in a vehicle configured to receive EFEG signals.

Embodiments describe a vehicle configured with a brain machine interface (BMI) for a vehicle computing system to control vehicle functions using electrical impulses from motor cortex activity in a user's brain. A BMI training system trains the BMI device to interpret neural data generated by a motor cortex of a user and correlate the neural data to a vehicle control command associated with a neural gesture emulation function. A BMI system onboard the vehicle may receive a continuous neural data feed of neural data from the user (when the user is physically present in the vehicle) using the trained BMI device, determine, a user intention for a control instruction that assists the driver in controlling a vehicle infotainment system using the continuous neural data feed, and perform an action based on the control instruction. The vehicle may further include a headrest configured as a Human Machine Interface (HMI) device that reads the brain electrical impulses of the user without invasive electrode connectivity. Embodiments of the present disclosure may provide for additional granularity of user control when interacting with vehicle computing systems, without tedious manual control operations. In other aspects, embodiments described in the present disclosure may streamline user interactions with vehicle infotainment systems in a fashion that is both convenient and does not distract the user's attention from the task of controlling the vehicle when it is being operated.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
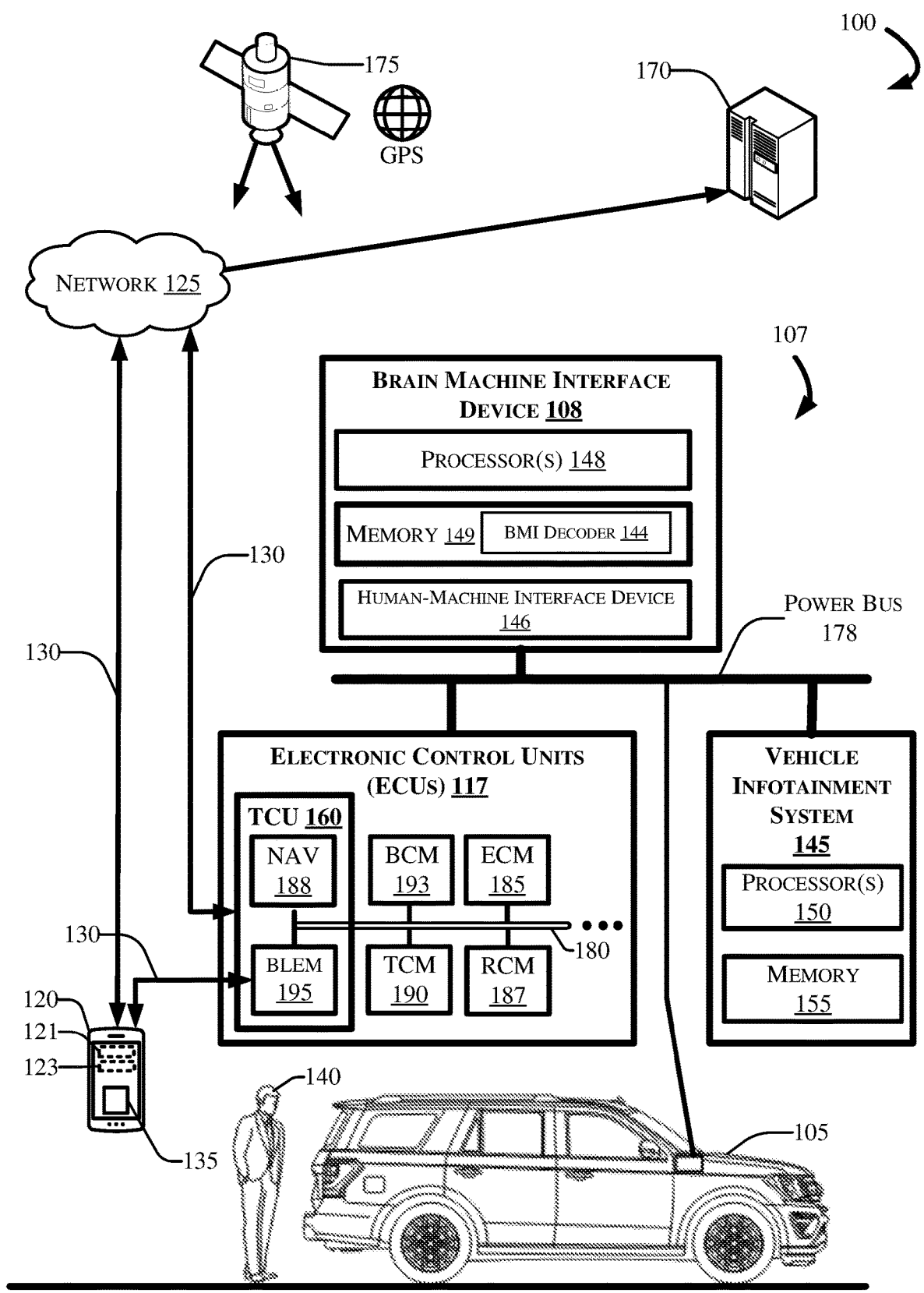
FIG. 1 depicts an example computing environment in which techniques and structures for providing the systems and methods disclosed herein may be implemented.

FIG. 1 depicts an example computing environment 100 that can include one or more vehicle(s) 105 comprising a vehicle infotainment system 145, a plurality of electronic control units (ECUs) 117, and a Brain Machine Interface (BMI) device 108, the BMI device 108 disposed in communication with the vehicle infotainment system 145 and the ECUs 117. A mobile device 120, which may be associated with a user 140 and the vehicle 105, may connect with the ECUs 117 and/or the vehicle infotainment system 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, and other possible transmission techniques. The mobile device 120 generally includes a memory 123 for storing program instructions associated with an application 135 that, when executed by a mobile device processor 121, performs aspects of the present disclosure. The application 135 may be part of the BMI system 107, or may provide information to the BMI system 107 and/or receive information from the BMI system 107.

FIG. 1 illustrates the vehicle infotainment system 145, which may be a vehicle-based computing system configured in communication with the BMI device 108. An example of such a vehicle-based computing system is the SYNC system manufactured by THE FORD MOTOR COMPANY. A vehicle enabled with the vehicle infotainment system 145 may contain a visual front-end interface (not shown in FIG. 1) located in the vehicle cabin. The user 140 may also be able to interact with the interface if it is provided, for example, with a touch sensitive screen (also not shown in FIG. 1). In conventional use, the user-machine interaction with the vehicle infotainment system 145 may occur through button presses and a spoken dialog system with automatic speech recognition and speech synthesis. The vehicle infotainment system 145 may include control aspects for a variety of entertainment and vehicle controls, such as media controls, mobile device interaction controls, cabin comfort controls, etc. Various control mechanisms associated with the vehicle infotainment system 145 are described generally as menus. In one aspect, a main menu may refer to a system-level menu that provides selective control of various systems that may be controllable using the vehicle infotainment system 145. A scroll left operation may provide a scroll action in a left direction, a scroll right operation may provide a scroll action in a right direction, and a menu item selection may be a click or selection on a menu item icon or alpha-numeric representation.

According to embodiments described in greater detail below with respect to the following figures, the BMI device 108 may receive a continuous neural data feed of neural data from a user (e.g., the user 140) using the BMI device 108, and determine, from the continuous neural data feed, a user intention for a command control instruction to control the vehicle infotainment system 145. The vehicle infotainment system 145 may perform an action based on the control instruction, such as, navigating a menu by scrolling the menu left, right, advancing to a next menu, selecting a previous menu, selecting a menu item, etc.

The vehicle infotainment system 145 may, in some example embodiments, be disposed in communication with the mobile device 120, and one or more server(s) 170, which may be associated with and/or include a Telematics Service Delivery Network (SDN).

Although illustrated as a sport utility, the vehicle 105 may take the form of another passenger or commercial automobile such as, for example, a car, a truck, a sport, a crossover vehicle, a van, a minivan, a taxi, a bus, etc. Further, the vehicle 105 may be a manually driven vehicle, and/or be configured to operate in a fully autonomous (e.g., driverless) mode or partially autonomous mode.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and sometimes steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, and can make informed decisions for themselves, such as accelerating past a slow-moving vehicle, while the driver remains ready to retake control of the vehicle if the system is unable to execute the task. Level-4 autonomy includes vehicles having high levels of autonomy that can operate independently of a human driver, but still include human controls for override operation. Level-4 automation may also enable a self-driving mode to intervene responsive to a predefined conditional trigger, such as a road hazard or a system failure. Level 5 autonomy is associated with autonomous vehicle systems that require no human input for operation, and generally do not include human operational driving controls.

In some aspects, the mobile device 120 may communicate with the vehicle 105 through the one or more wireless channel(s) 130, which may be encrypted and established between the mobile device 120 and a Telematics Control Unit (TCU) 160. The mobile device 120 may communicate with the TCU 160 using a wireless transmitter associated with the TCU 160 on the vehicle 105. The transmitter may communicate with the mobile device 120 using a wireless communication network such as, for example, the one or more network(s) 125, and/or a Global Position System (GPS) satellite network 175. The wireless channel(s) 130 are depicted in FIG. 1 as communicating via the one or more network(s) 125, and also via direct communication with the vehicle 105.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The vehicle infotainment system 145 may be installed in an engine compartment of the vehicle 105 (or elsewhere in the vehicle 105) and operate as a functional part of the BMI system 107, in accordance with the disclosure. The vehicle infotainment system 145 may include one or more processor(s) 150 and a computer-readable memory 155. The vehicle infotainment system 145 may include, in one example, the one or more processor(s) 150, and the computer-readable memory 155.

The BMI device 108 may be disposed in communication with the ECUs 117, and may be configured to provide (in conjunction with the ECUs 117) system-level control of the vehicle 105. The ECUs 117 may be disposed in communication with and/or be a part of the vehicle infotainment system 145, and may share a common power bus 178 with the vehicle infotainment system 145 and the BMI system 107. The BMI device 108 may further include one or more processor(s) 148, a memory 149 disposed in communication with the processor(s) 148, and a Human-Machine Interface (HMI) device 146 configured to interface with the user 140 by receiving motor cortex signals as the user operates the vehicle using the BMI device 108.

The one or more processor(s) 148 and/or 150 may be disposed in communication with one or more memory devices connected with the respective computing systems (e.g., the memory 149, the memory 155 and/or one or more external databases that are not shown in FIG. 1). The processor(s) 148 and 150 may utilize the memory to store programs in code and/or to store data for performing aspects in accordance with the disclosure. The memory 149 and 155 may be a non-transitory computer-readable memory storing a BMI decoder 144. The memory 149 and 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The ECUs 117 can include any number of various control modules such as, for example, a Body Control Module (BCM) 193, an Engine Control Module (ECM) 185, a Transmission Control Module (TCM) 190, a Telematics Control Unit (TCU) 160, a Restraint Control Module (RCM) 187, etc. In some aspects, the ECUs 117 may control aspects of the vehicle 105 through the ECUs 117, and implement one or more instruction sets received from the application 135 operating on the mobile device 120, from one or more instruction sets received from the BMI device 108, and/or from instructions received from Driver Assisted Technologies (DAT) controller such as a DAT controller 245 discussed with respect to FIG. 2.

The TCU 160 may be configured to provide vehicle connectivity to wireless computing systems onboard the vehicle 105 and offboard the vehicle 105. The TCU 160 may include a Navigation/GPS receiver 188 and/or a Bluetooth® Low-Energy Module (BLEM) 195, and/or other control modules configurable for wireless communication between the vehicle 105 and other systems, computers, and modules. The TCU 160 may also provide communication and control access between ECUs 117 using a Controller Area Network (CAN) bus 180, by retrieving and sending data from the CAN bus 180, and coordinating the data between vehicle 105 systems, connected servers (e.g., the server(s) 170), and other vehicles (not shown in FIG. 1) operating as part of a vehicle fleet.

The BLEM 195 may establish wireless communication using Bluetooth® communication protocols by broadcasting and/or listening for the broadcast of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The CAN bus 180 may be configured as a multi-master serial bus standard for connecting two ECUs as nodes using a message-based protocol that can be configured and/or programmed to allow the ECUs 117 to communicate with each other. The CAN bus 180 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may, in some configurations, use a linear bus configuration. In some aspects, the ECUs 117 may communicate with a host computer (e.g., the vehicle infotainment system 145, the BMI system 107, and/or the server(s) 170, etc.), and may also communicate with one another without the necessity of a host computer. The CAN bus 180 may connect the ECUs 117 with the vehicle infotainment system 145 such that the vehicle infotainment system 145 may retrieve information from, send information to, and otherwise interact with the ECUs 117 to perform steps described according to embodiments of the present disclosure.

The ECUs 117, when configured as nodes in the CAN bus 180, may each include a central processing unit, a CAN controller, and a transceiver (not shown in FIG. 1). In an example embodiment, the ECUs 117 may control aspects of vehicle operation and communication based on inputs from human drivers, a DAT controller, the BMI system 107, and via wireless signal inputs received from other connected devices such as the mobile device 120, among others.

The ECUs 117 may control various loads directly via the CAN bus 180 communication or implement such control in conjunction with the BCM 193. The ECUs 117 are described for exemplary purposes only, and are not intended to be limiting or exclusive. Control and/or communication with other control modules not shown in FIG. 1 is possible, and such control is contemplated.

The BCM 193 generally includes integration of sensors, vehicle performance indicators, and variable reactors associated with vehicle systems, and may include processor-based power distribution circuitry that can supervise, and control, functions related to the car body such as lights, windows, security, door locks and access control, and various comfort controls. The central BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The computing system architecture of the vehicle infotainment system 145, ECUs 117, and/or the BMI system 107 may omit certain computing modules. It should be readily understood that the computing environment depicted in FIG. 1 is one example of a possible implementation according to the present disclosure, and thus, it should not be considered limiting or exclusive.

Figure 2:
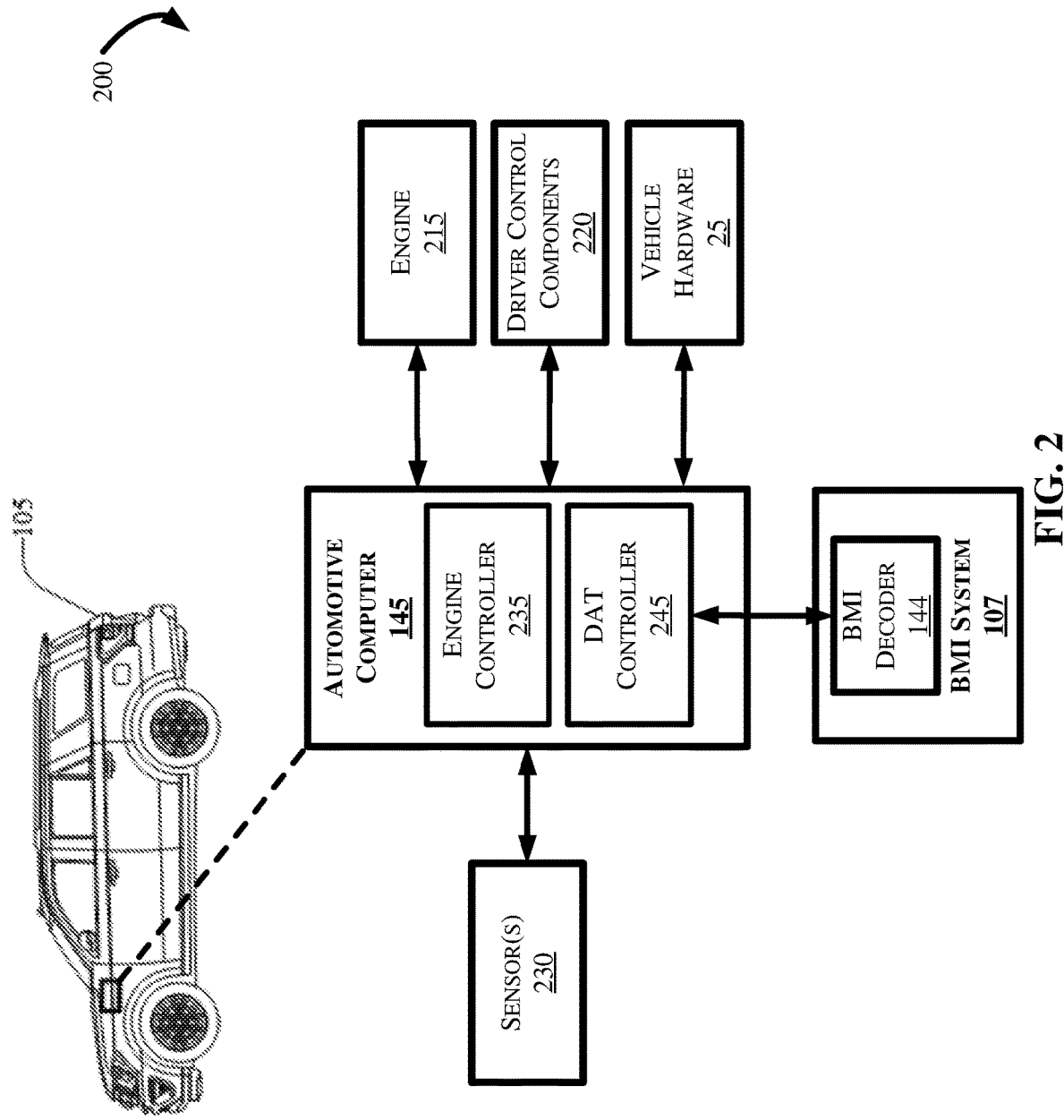
FIG. 2 illustrates a functional schematic of an example architecture of an automotive control system for use with the vehicle, in accordance with the present disclosure.

FIG. 2 illustrates a functional schematic of an example architecture of an automotive control system 200 that may be used for control of the vehicle 105, in accordance with the present disclosure. The control system 200 may include the BMI system 107, which may be disposed in communication with the vehicle infotainment system 145, and vehicle control hardware including, for example, an engine/motor 215, driver control components 220, vehicle hardware 225, sensor(s) 230, and the mobile device 120 and other components not shown in FIG. 2.

The vehicle 105, in the embodiment depicted in FIG. 2, may include any level of autonomy, and in some example embodiments, be a Level 3, Level 4, or Level 5 autonomous vehicle. The BMI system 107 executing the BMI decoder 144, may process the continuous data feed of neural data from the user, and determine a user intention for a vehicle command control instruction from the continuous neural data feed. The BMI decoder 144 may select a stored neural gesture emulation function, which gestures may include various positions or movements of the hand or wrist associated with the user intention, and generate the command control instruction by way of the neural gesture emulation function.

Interpreting neural data received and processed from the motor cortex of a user's brain is possible when the BMI device 108 has been trained and tuned to a particular user's neural activity patterns. The training procedures can include systematically mapping a continuous neural data feed obtained from that user and stored by the system, where the data feed processing results provide quantitative values associated with user brain activity as the user provides manual input into a cursor device. The training system may form associations for patterns of neural cortex activity (e.g., a correlation model) as the user performs simulation exercises associated with real-time vehicle operation. Accordingly, when configured with the trained BMI device that uses the trained correlation model, the DAT controller 245 may control the vehicle infotainment system 145 and other vehicle systems by performing at least some aspects of vehicle operation autonomously, and provide other aspects of vehicle control to the user through the trained BMI system 107.

Figure 3:
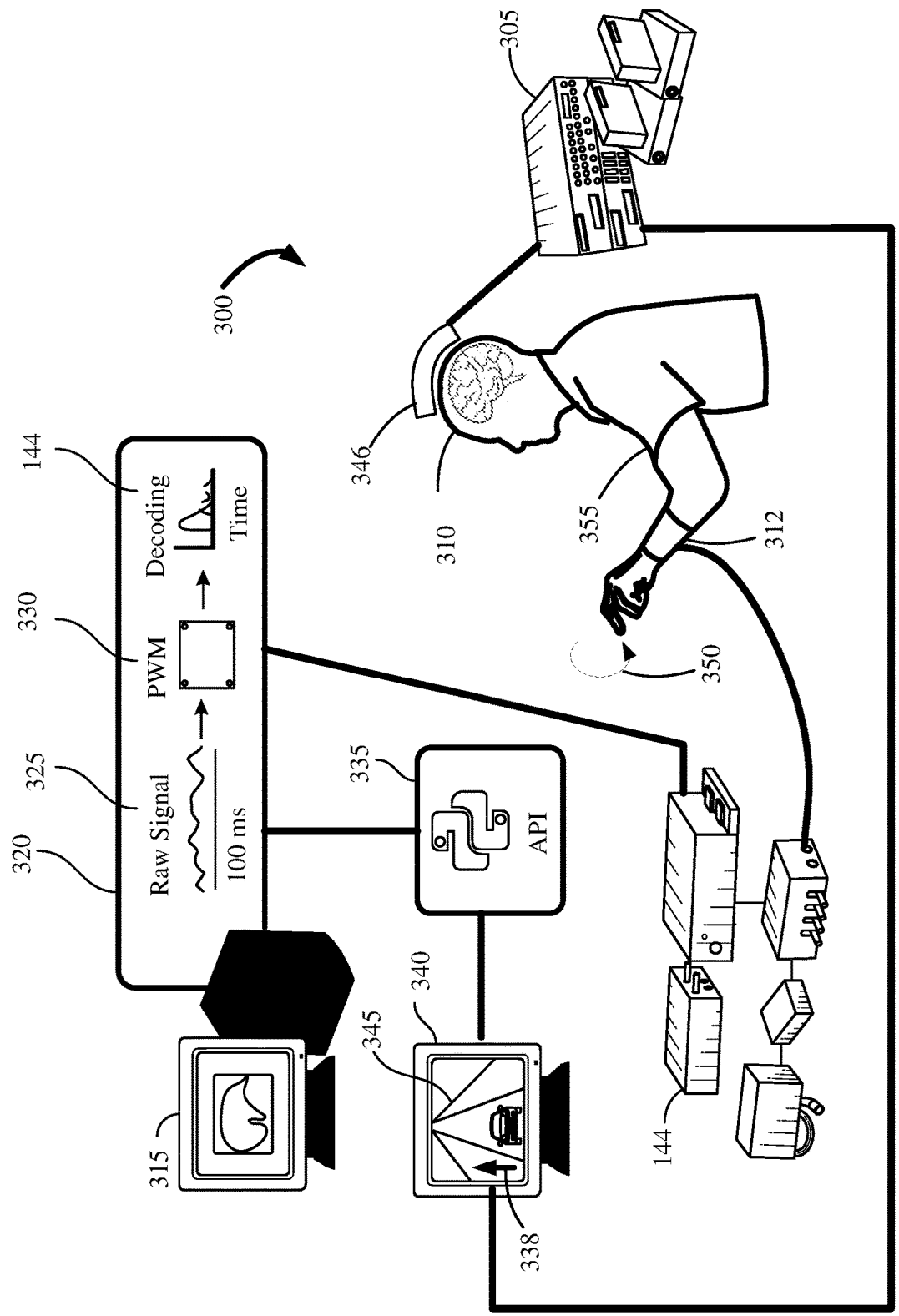
FIG. 3 illustrates an example BMI training system in accordance with an embodiment of the present disclosure.

FIG. 3 illustrates an example BMI training system 300, in accordance with an embodiment of the present disclosure. The BMI training system 300 may include a neural data acquisition system 305, a training computer 315 with digital signal processing (DSP) decoding, and an application programming interface (API) 335.

The neural data acquisition system 305 and the training computer 315 may be and/or include components from a conventional neural bridging system.

By way of a brief overview, the following paragraphs will provide a general description for an example method of training the BMI system 107 using the BMI training system 300. In one aspect, a user 310 may interact with a manual input device 312 and provide continuous repetitive inputs simulating well understood hand motor control brain commands into the BMI training system. The BMI training system 300 may then generate a decoding model, based on the user inputs, for interpreting neural cortex activity in this area that has been customized for this particular user. For example, the training system 300 may present a pointer 338 on a display device of a training computer 340. The user 310 may provide perhaps dozens or hundreds of instances of repetitive, but yet still attentive, manual inputs and gestures using the manual input device 312. This manual input can include an arm, hand, finger flexion gesture, or other movement, where the movement interacts with a pointer 338 on the display device of the training computer 340. In one aspect, the user 310 may provide these manual control input simulation gestures while operating a driving simulation program 345. While the user 310 performs the simulated manual input gestures, the system 300 may also obtain the user's neural data using the neural data acquisition system 305, such that associations may be formed between the simulated manual input gestures and the neural data. The BMI training system 300 may collect the user's neural data (e.g., raw data input) and perform a comparison procedure where the user 310 performs a series of imagined, well understood brain commands of hand motor control movements 350 using an input arm 355 (where the imagined inputs can include such gestures as a hand close, a hand open, finger flexion, forearm pronation, and forearm supination, among other well understood hand motor control movement gestures). Some embodiments may include performing the comparison procedure while the neural data acquisition system 305 obtains raw signal data from a continuous neural data feed indicative of brain activity correlated with repetitive arm/hand/finger gestures of the user 310.

Obtaining the continuous neural data feed may include processing the receipt of such gestures at the training computer 340 as a time series of decoder values from a microelectrode array 346. For example, the neural data acquisition system 305 may obtain the neural data by sampling the continuous data feed at a predetermined rate (e.g., 4 decoder values every 100 ms, 2 decoder values every 100 ms, 10 decoder values every 100 ms, etc.). The BMI training system 300 may generate a correlation model (not shown in FIG. 3) that correlates the input of the continuous neural data feed to the fuzzy state associated with a first vehicle control function. The BMI training system may save the decoder values 325 to a computer memory 330, then convert the decoder values to brain motor cortex mapping data using pulse width modulation and other DSP techniques via the digital signal processor 320. The BMI decoder 144 may map stored data to aspects of the vehicle infotainment system 145 control, such as, for example, navigating to a particular menu, scrolling through various menu items, selecting a menu item and executing the menu item.

The microelectrode array 346 may be configured to receive the continuous neural data feed of neural data from the user 310, where the neural data from the user is representative of a learned model derived from a multiplicity of recorded attentive and repetitive simulations of arm/hand/finger gestures where the gestures are associated with vehicle control and/or performance of manual movements meant to represent such control. In one example procedure, a movement imagined by the user and repetitively simulated via the arm/hand/finger gestures may be mapped to increment a state to a next-contiguous state (e.g., from low speed to medium speed). In another aspect a movement imagined by the user and repetitively simulated via the arm/hand/finger gestures may be mapped to decrement a state to a next-contiguous state (e.g., a reverse action from the increment operation). In another example, the user may imagine and repetitively simulate via arm/hand/finger gestures a movement for engaging the vehicle into particular states, or combinations of states (e.g., a low velocity during a slight right steering function).

The user 310 may be the same user as shown in FIG. 1, who may operate the vehicle with the trained BMI system 107, where the training procedure is specific to that particular user. In another aspect, the training procedure may provide a correlation model that correlates a multiplicity of neural data feed aggregate information to vehicle control commands associated with a neural gesture emulation function. The natural gesture emulation function may be associated with control instruction for selecting a menu item, for navigating a menu structure, and performing other operations. The generalized correlation model applies a generalized neural cortex processing to a wider array of possible neural patterns, such that the generalized model may be readily adopted by any user with some limited tuning and training. One method contemplated to produce a generalized model may include, for example, the use of machine learning techniques that include deep neural network correlation model development.

The microelectrode array 346 may be configured to obtain neural data from the primary motor cortex of a user 310 acquired through non-invasive, or possibly invasive, neural motor cortex connection. For example, in one aspect, using a non-invasive approach, the microelectrode array 346 may include a plurality of wireless receivers that wirelessly measure brain potential electrical fields using an electric field encephalography (EFEG) device. An example of an invasive approach to neural data acquisition may include an implanted 96-channel intracortical microelectrode array configured to communicate through a port interface (e.g., a NeuroPort® interface, currently available through Blackrock Microsystems, Salt Lake, Utah).

The training computer 315 may further receive the data feed of neural motor cortex activity of the user 310 via wireless or wired connection (e.g., using an Ethernet to PC connection) from the neural data acquisition system 305. The training computer 315 may be, in one example embodiment, a workstation running a MATLAB®-based signal processing and decoding algorithm. Other math processing and DSP input software are possible and contemplated. The BMI training system may generate the correlation model that correlates the raw neural data feed into various fuzzy states associated with the vehicle control functions (described in greater detail with respect to FIG. 4) using Support Vector Machine (SVM) Learning Algorithms (LIBSVM) to classify neural data into arm/hand/finger movements (e.g. supination, pronation, hand open, hand closed, finger flexion, etc.).

The arm, hand and finger movements (hereafter collectively referred to as "hand movements 350") may be user-selected for their intuitiveness in representing infotainment system controls (rightward scrolling, leftward scrolling, previous menu navigation, next menu navigation, item selection, item execution, etc.). For example, the BMI training system may include an input program configured to prompt the user 310 to perform a gesture that represents scrolling forward, scrolling back, navigating to a main menu, selecting an item, executing an item, etc. The BMI training system may record the manual input and neural cortex brain activity associated with the responsive user input. Decoded hand movements are depicted in FIG. 3 as user movements of a hand gesture simulation. In one embodiment, the BMI training system may include a neuromuscular electrical stimulator system (not shown in FIG. 3) to obtain neural feedback of neural activity and provide the feedback to the user 310 based on the user's motor intent.

The BMI training system 300 may generate a correlation model that correlates the neural data feed to the neural gesture emulation function, where the neural gesture emulation function is associated with a control instruction for selecting the menu item. When configured with the vehicle 105, the BMI system 107 may convert the neural data to a control instruction to control a vehicle infotainment system. As described in greater detail with respect to FIG. 4, a vehicle control function selector 415 is configured during the training procedure (e.g., the output of the training system 300) to match the gesture emulation functions that are associated with menu selection and menu navigation to neural decoding of the neural data from the user.

In some aspects, a user may become fatigued after engaging in a semi-autonomous driving function over a prolonged period of time. It is therefore advantageous to provide a baseline gesture reward function that may train the machine learning system to compensate for such fatigue drift in use. The baseline gesture learning may be done in the initial training process. One the user 310 has engaged a semi-autonomous driving function, the system 300 may utilize a reward function to calculate a drift offset for gesture commands. For example, if the user 310 has started performance of the canonical geometry, and sustained the gesture for a period of time, fatigue may be an issue. As such, the system 300 may calculate the neural firing patterns by observing the neural activity from a set of starting states or positions, and observe the firing patterns over time for offset due to mental fatigue. The system 300 may calculate the offset based on an expected value (e.g., the canonical geometry, for example), along with a compensation factor that accounts for fatigue drift.

The reward function shall give rewards if the compensated gesture recognition provides the expected command (e.g. completion of the canonical geometry or providing the "go" signal). This reward would enable the BMI training system 300 to include the latest offset data for greater tolerance. Conversely, if the compensated neural output does not generate the expected gesture recognition, the system 300 may reduce the reward function tolerance on gesture recognition, and require the driving feature to pause for a predetermined period of time.

Figure 4:
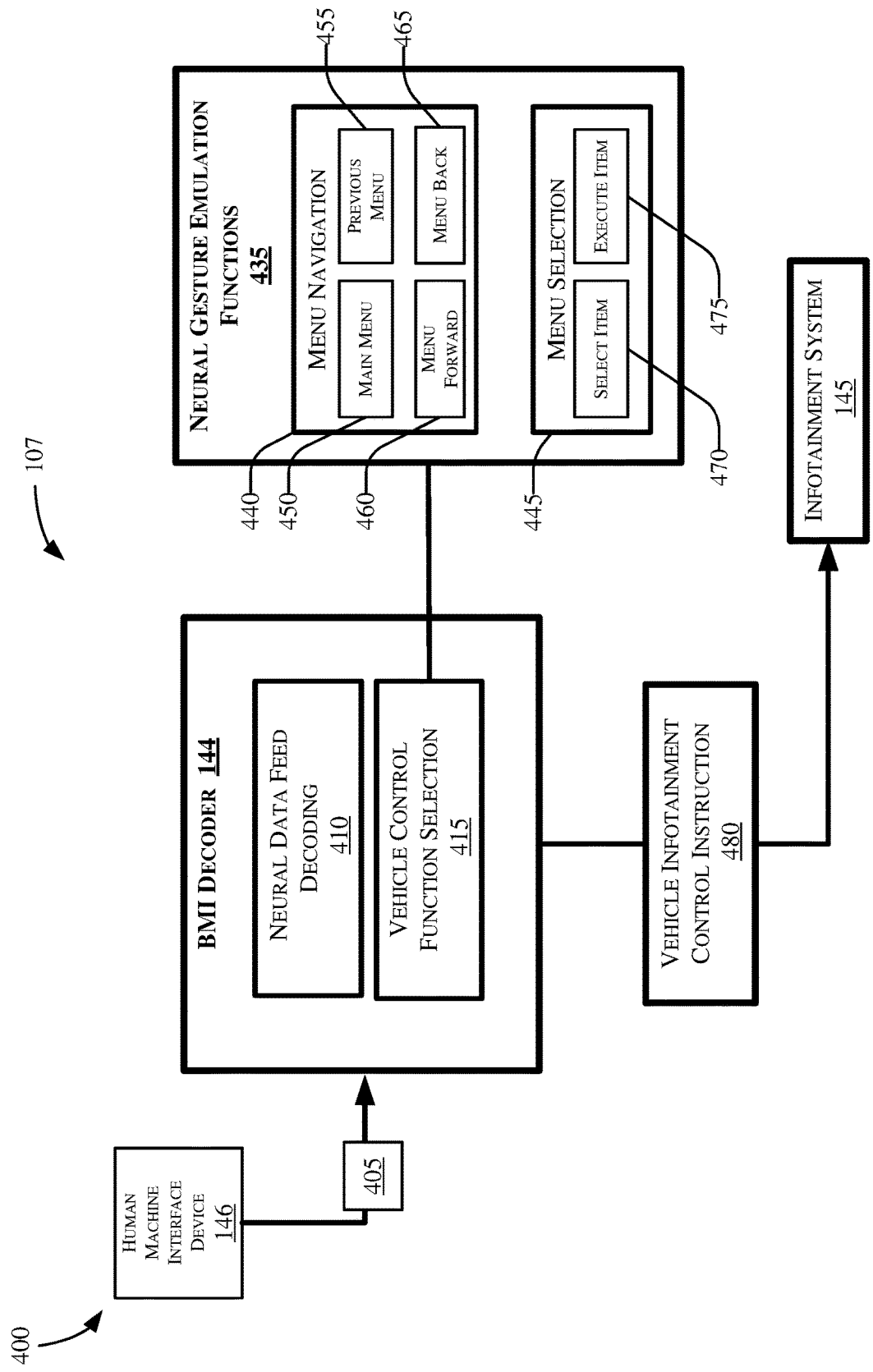
FIG. 4 depicts a functional block diagram of the BMI system 107 in accordance with an embodiment the present disclosure.

FIG. 4 is a functional block diagram 400 depicting infotainment system control using the BMI system 107, in accordance with an embodiment of the present disclosure. The BMI decoder 144 may receive the neural data 405 from the Human Machine Interface (HMI) device 146. In an example scenario, a user (not shown in FIG. 4) may interface with the HMI device 146 and perform thought control steps consistent with the training procedures described with respect to FIG. 3.

In one aspect, the neural data feed decoder 410 may decode the neural data 405 to determine a gesture intention of the user by matching pattern(s) in the neural data 405 to patterns of neural cortex activity of the user recorded during the training operation of FIG. 3. For example, the neural data may be indicative of a menu navigation function 440 that includes a set of functions associated with menu navigation. The menu navigation functions 440 may include, in one example, a main menu function 450, a previous menu function 455, a menu forward function 460, and a menu back function 465.

The neural data 405 may further be indicative of a menu selection function 445 that includes a set of functions associated with menu selection. The menu selection functions 445 may include, in one example, a select item function 470, and an execute item function 475.

The BMI decoder 144 may select a neural gesture emulation function 435, (one of the menu navigation functions 440 and/or the menu selection function 445, for example) associated with the user gesture intention, and generate the command control instruction by way of the selected neural gesture emulation function.

After matching the user gesture intention received from the neural data feed decoder 410 to a neural gesture emulation function associated with the user intention, the BMI system 107 may provide, to the vehicle infotainment system 145, a vehicle infotainment command control instruction 480. The command control instruction 480 causes the vehicle infotainment system 145 to navigate or select a menu item based on the navigation functions 440 and the menu selection functions 445.

Figure 5:
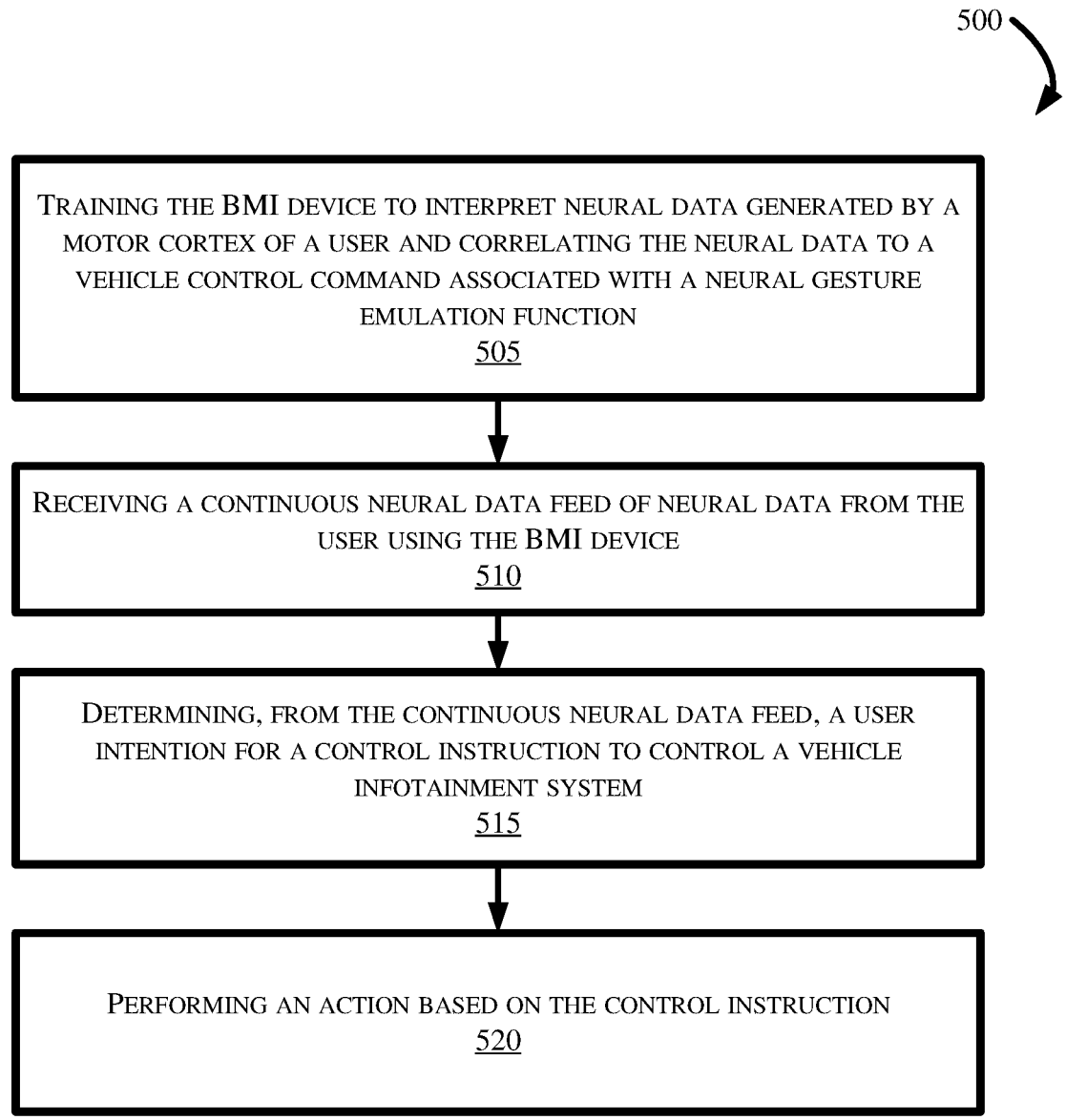
FIG. 5 depicts a flow diagram in accordance with the present disclosure.

FIG. 5 is a flow diagram of an example method 500 for controlling a vehicle using the BMI system 107, according to the present disclosure. FIG. 5 may be described with continued reference to elements of prior figures, including FIGS. 1-4. The following process is exemplary and not confined to the steps described hereafter. Moreover, alternative embodiments may include more or less steps that are shown or described herein, and may include these steps in a different order than the order described in the following example embodiments.

Referring first to FIG. 5, at step 505, the method 500 may commence with training the BMI device to interpret neural data generated by a motor cortex of a user and correlating the neural data to a vehicle control command associated with a neural gesture emulation function. In some aspects, the step can include receiving, from a data input device, a data feed indicative of a user body gesture, obtaining a continuous neural data feed from the user repetitively performing the user body gesture, and generating a correlation model that correlates the continuous neural data feed to the neural gesture emulation function. In some aspects, the neural gesture emulation function may be associated with a control instruction for selecting a menu item. It should be understood that data received from the data input device be continuous or discrete and for the exemplary purposes described herein, the continuous data will be described as an example.

Next, the method includes a step 510 of receiving a continuous neural data feed of neural data from the user using the BMI device.

At step 515, the method 500 may further include determining, from the continuous neural data feed, a user intention for a control instruction to control a vehicle infotainment system. Determining the user intention can include selecting the neural gesture emulation function associated with the user intention, and generating the control instruction by way of the neural gesture emulation function. The neural gesture emulation function is a member of a set of Gaussian kernel-type membership functions.

At step 520, the method 500 includes performing an action based on the control instruction. In one example, the action can include providing, to the vehicle infotainment system, a control instruction, where the control instruction causes the vehicle infotainment system to navigate or select a menu item. In another example, the action can include causing the vehicle infotainment system to navigate a menu system to a main menu. In another aspect, the action may include scrolling right on a current menu, or scrolling left on a current menu. The action may further include navigating to a previous menu. In yet other aspects of the present disclosure, the action may include selecting a menu item and/or executing a menu item.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle using a brain machine interface (BMI) device, comprising:
   training the BMI device to interpret neural data generated by a motor cortex of a user and correlating the neural data to a vehicle control command associated with a first neural gesture emulation function;
   receiving a first neural data feed of first neural data from the user using the BMI device;
   determining, from the first neural data feed, a user intention for a first control instruction to control a vehicle infotainment system via a correlation model generated via machine learning techniques; and
   performing an action to control the vehicle infotainment system based on the first control instruction, wherein the action includes at least one of: navigating a menu system of the vehicle infotainment system to a previous menu, navigating the menu system to a main menu, navigating the menu system to a subsequent menu, and scrolling left or right on a current menu of the menu system.

2. The method according to claim 1, wherein the training comprises:
   prompting, by the vehicle, the user to perform a first gesture to associate with the first control instruction for the vehicle infotainment system;
   receiving, from a data input device, a first data feed indicative of a first user body gesture;
   obtaining the first neural data feed from the user performing the first user body gesture, the first neural data feed including one or more first decoder values; and
   generating the correlation model via the machine learning techniques that correlates the first neural data feed to the first neural gesture emulation function, wherein the first neural gesture emulation function is associated with the first control instruction for the vehicle infotainment system;
   converting the one or more first decoder values into brain motor cortex mapping data; and
   mapping the brain motor cortex mapping data to the first control instruction for the vehicle infotainment system.

3. The method according to claim 2, wherein the training further comprises:
   prompting, by the vehicle, the user to perform a second gesture to associate with incrementing the first control instruction to a next-contiguous state;
   receiving, from the data input device, a second neural data feed indicative of a second user body gesture;
   obtaining the second neural data feed from the user performing the second user body gesture, the second neural data feed including one or more second decoder values;
   generating the correlation model via the machine learning techniques that correlates the second neural data feed to a second neural gesture emulation function, wherein the second neural gesture emulation function is associated with a second control instruction for incrementing the first control instruction to a next-contiguous state;
   converting the one or more second decoder values into second brain motor cortex mapping data; and
   mapping the second brain motor cortex mapping data to the second control instruction.

4. The method according to claim 3, wherein the training further comprises:
   prompting, by the vehicle, the user to perform a third gesture to associate with decrementing the first control instruction to a next-contiguous state;
   receiving, from the data input device, a third neural data feed indicative of a third user body gesture;
   obtaining the third neural data feed from the user performing the third user body gesture, the third neural data feed including one or more third decoder values;
   generating the correlation model via the machine learning techniques that correlates the third neural data feed to a third neural gesture emulation function, wherein the third neural gesture emulation function is associated with a third control instruction for decrementing the first control instruction to a next-contiguous state;
   converting the one or more third decoder values into third brain motor cortex mapping data; and
   mapping the third brain motor cortex mapping data to the third control instruction.

5. The method according to claim 2, wherein the training further comprises:
   determining, during which the first gesture is sustained, a change in neural firing patterns over a period of time associated with the first neural data, the change in neural firing patterns being indicative of user fatigue;
   determining, based on the change in neural firing patterns, an offset value for the first control instruction;
   receiving, by the BMI device, second neural data within the offset value that is indicative of the first gesture;
   determining that the first control instruction is performed based on the second neural data; and
   providing, by a reward function and based on the control instruction being performed, a reward to the BMI device.

6. The method according to claim 1 wherein determining the user intention comprises:
   selecting the first neural gesture emulation function associated with the user intention; and
   generating the first control instruction by way of the first neural gesture emulation function.

7. The method according to claim 6, wherein the first neural gesture emulation function is a member of a set of Gaussian kernel-type membership functions.

8. The method according to claim 1, wherein the action comprises:
   providing, to the vehicle infotainment system, a control instruction, wherein the control instruction causes the vehicle infotainment system to navigate or select a menu item.

9. The method according to claim 1, wherein the BMI device is trained to calculate an offset based on a baseline gesture reward function configured to compensate for fatigue drift.

10. A brain machine interface (BMI) device for controlling a vehicle, comprising:
    a processor; and
    a memory for storing executable instructions, the processor configured to execute the instructions to:
    receive a neural data feed of neural data from a user using the BMI device;

determine, from the neural data feed, a user intention for a control instruction to control a vehicle infotainment system via a correlation model generated via machine learning techniques; and perform an action to control the vehicle infotainment system based on the control instruction, wherein the action includes at least one of: navigating a menu system of the vehicle infotainment system to a previous menu, navigating the menu system to a main menu, navigating the menu system to a subsequent menu, and scrolling left or right on a current menu of the menu system.

11. The BMI device according to claim 10, wherein the processor is further configured to execute the instructions to:
select a neural gesture emulation function associated with the user intention; and
generate the control instruction by way of the neural gesture emulation function.

12. The BMI device according to claim 11, wherein the neural gesture emulation function is a member of a set of Gaussian kernel type membership functions.

13. The BMI device according to claim 10, wherein the processor is further configured to execute the instructions to:
train the BMI device to calculate an offset based on a baseline gesture reward function configured to compensate for fatigue drift; and
provide a control instruction to the vehicle infotainment system, wherein the control instruction causes the vehicle infotainment system to navigate or select a menu item.

14. A non-transitory computer-readable storage medium in a brain machine interface (BMI) device, the non-transitory computer-readable storage medium having instructions stored thereupon which, when executed by a processor, cause the processor to:

receive a neural data feed of neural data from a user using the BMI device;
determine, from the neural data feed, a user intention for a control instruction to control a vehicle infotainment system via a correlation model generated via machine learning techniques; and
provide, to the vehicle infotainment system, a control instruction, wherein the control instruction causes the vehicle infotainment system to navigate a menu system of the vehicle infotainment system to a previous menu, navigate the menu system to a main menu, navigate the menu system to a subsequent menu, and scroll left or right on a current menu of the menu system.

15. The non-transitory computer-readable storage medium according to claim 14, having further instructions stored thereupon to:
select a neural gesture emulation function associated with the user intention; and
generate the control instruction by way of the neural gesture emulation function.

16. The non-transitory computer-readable storage medium according to claim 15, wherein the neural gesture emulation function is a member of a set of Gaussian kernel type membership functions.

17. The non-transitory computer-readable storage medium according to claim 14, having further instructions stored thereupon to:
train the BMI device to calculate an offset based on a baseline gesture reward function configured to compensate for fatigue drift; and
provide a control instruction to the vehicle infotainment system, wherein the control instruction causes the vehicle infotainment system to navigate or select a menu item.

* * * * *